(12) United States Patent
Smith

(10) Patent No.: US 9,162,261 B1
(45) Date of Patent: Oct. 20, 2015

(54) SYSTEMS AND METHODS FOR CONTROLLING SILICA DUST DURING HYDRAULIC FRACTURING OPERATIONS

(71) Applicant: Sierra Frac Sand, LLC, Tatum, TX (US)

(72) Inventor: Kim R. Smith, Tatum, TX (US)

(73) Assignee: Sierra Dust Control, LLC, Tatum, TX (US)

( * ) Notice: Subject to any disclaimer, the term of this patent is extended or adjusted under 35 U.S.C. 154(b) by 0 days.

(21) Appl. No.: 13/769,456

(22) Filed: Feb. 18, 2013

(51) Int. Cl.
*B08B 5/04* (2006.01)
*B08B 15/00* (2006.01)

(52) U.S. Cl.
CPC . *B08B 5/046* (2013.01); *B08B 5/04* (2013.01); *B08B 15/002* (2013.01)

(58) Field of Classification Search
None
See application file for complete search history.

(56) References Cited

U.S. PATENT DOCUMENTS

| | | | |
|---|---|---|---|
| 4,246,014 A * | 1/1981 | Wright et al. | 55/378 |
| 2012/0247335 A1 | 10/2012 | Stutzman et al. | |
| 2013/0186510 A1 | 7/2013 | Stutzman et al. | |
| 2013/0309052 A1 * | 11/2013 | Luharuka et al. | 414/291 |

OTHER PUBLICATIONS

Frac Sand Dust Control, Power Point Slides, KSW Environmental, Dec. 6, 2012, http://kswenvironmental.com.
Providing Flexible Solutions for Frac Sand Dust Collection, Website, Frac Sand Dust Control LLC, 2012, http://fracsanddc.com.
Anderson, Travis, Frac-Site Dust Control, Oil & Gas Safety Conference 2012, http://oshasafetyconference.org/events/ugm/osha2012/presentations/anderson.

* cited by examiner

*Primary Examiner* — Michael Kornakov
*Assistant Examiner* — Ryan Coleman
(74) *Attorney, Agent, or Firm* — James J. Murphy; Thompson & Knight LLP

(57) ABSTRACT

A system for controlling silica dust generated during the transfer of frac sand from a storage container through a conveyor system includes a system of conduits having a plurality of inlets for collecting silica dust generated at selected points along the conveyor system. An air system pneumatically coupled to the system of conduits generates a negative pressure at each of the inlets to induce the collection of silica dust at the selected points along the conveyor.

19 Claims, 14 Drawing Sheets

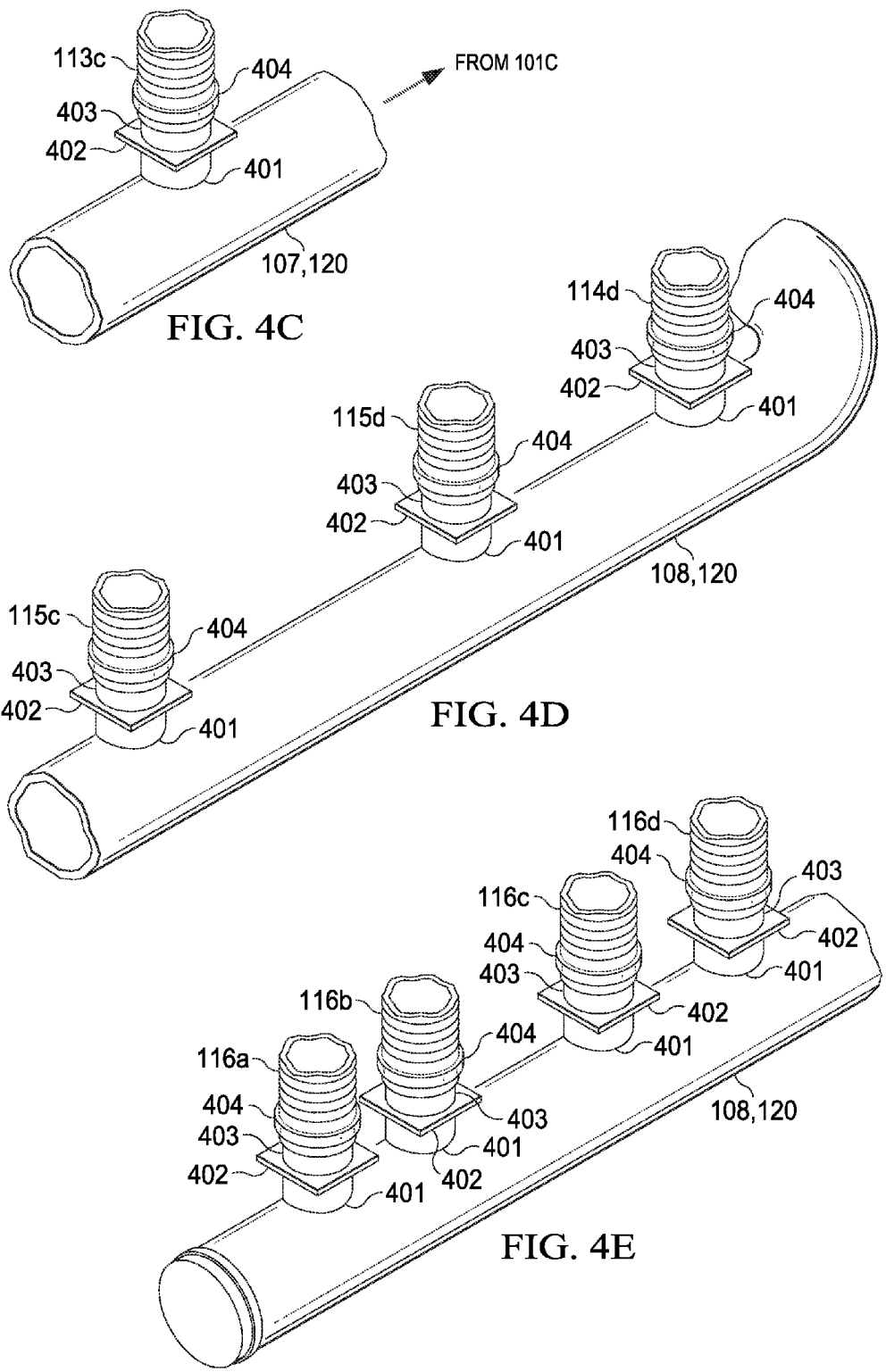

SYSTEMS AND METHODS FOR CONTROLLING SILICA DUST DURING HYDRAULIC FRACTURING OPERATIONS

FIELD OF INVENTION

The present invention relates in general to hydraulic fracturing, and in particular to systems and methods for controlling silica dust during the handling of frac sand.

BACKGROUND OF INVENTION

Hydraulic fracturing ("fracing") is a well known technique for releasing oil and natural gas from underground reservoirs within rock formations having a limited permeability. For example, fracing is often used to release oil and natural gas, such as natural gas or oil, from shale formations.

Fracing is a well completion technique performed after the drilling of the wellbore, which in the case of releasing natural gas from shale, is commonly a horizontal wellbore, although occasionally the wellbore is vertical. Fracing fluid, which is primarily water and chemicals that form a viscous gel, is pumped into the well to create fractures within the surrounding rock. The viscous gel carries a "proppant" into the fractures, such that when the pumping stops, the fractures remain substantially open and allow the oil and natural gas to escape into the wellbore.

One typical proppant is "frac sand." Frac sand is normally high purity silica sand with grains having a size and shape capable of resisting the crushing forces applied during the closing of the fractures when the hydraulic force provided by the pumping is removed. However, given that frac sand contains a high proportion of silica, the loading, transportation, and unloading of frac sand presents significant safety challenges.

The United States Occupational Safety and Health Administration ("OSHA") lists silica as a carcinogen. In particular, the exposure and inhalation of silica dust has been linked to silicosis, which is an irreversible lung disorder characterized by inflammation and scarring of the upper lobes of the lungs. The best, and perhaps only way, to reduce or eliminate the threat of silicosis is to carefully control worker exposure to silica dust.

OSHA lists a number of different ways to limit worker exposure to silica dust, including limiting worker time at a worksite, limiting the number of workers at a worksite, watering roads and other worksite areas, enclosing points where silica dust is released, and requiring workers to wear respirators. These techniques do not, at least on their own, provide a complete solution to the problem of controlling silica dust. Furthermore, these existing techniques, while commendable, are nonetheless burdensome, time-consuming, inefficient, and impractical.

SUMMARY OF INVENTION

According to one representative embodiment of the principles of the present invention, a system is disclosed for controlling silica dust generated during the transfer of frac sand from a storage container through a conveyor system and includes a system of conduits having a plurality of inlets for collecting silica dust generated at selected points along the conveyor system. An air system pneumatically coupled to the system of conduits generates a negative pressure at each of the inlets to induce the collection of silica dust at the selected points along the conveyor, including container access ports, belt-to-belt drops, and belt-to-blender drops.

The present inventive principles advantageously provide for efficient and flexible systems and methods for collecting the silica dust generated during the offload of frac sand from one or more trailers or other storage facility at a fracing worksite. In particular, silica dust may be collected, as needed, at the base of the conveyor integral to each trailer ("trailer conveyor"), the point of discharge from each trailer conveyor to an associated portable conveyor system, at points along the portable conveyor system, and from within the trailer itself. The application of these principles improves the efficiency and flexibility of the frac sand offloading process by allowing increased worker time at the worksite and/or for more workers to be present at the worksite at one time, reducing the need for watering of worksite areas and the enclosure of points where silica dust is released, reducing the need for respirator wear, and decreasing the amount of silica dust intake by the engines of nearby vehicles and equipment.

BRIEF DESCRIPTION OF DRAWINGS

For a more complete understanding of the present invention, and the advantages thereof, reference is now made to the following descriptions taken in conjunction with the accompanying drawings, in which:

FIG. 4C is a diagram showing in further detail the pneumatic connection between a selected manifold and the silica dust control conduit subsystem serving another selected trailer of FIG. 1;

FIG. 4D is a diagram showing in further detail the pneumatic connections between a selected manifold and the silica dust capture hose controlling silica dust generated during the operation of a corresponding trailer discharge conveyor shown in FIG. 1;

FIG. 4E is a diagram showing in further detail the pneumatic connections between a selected manifold and the silica dust capture hoses controlling silica dust generated by the system discharge conveyor of FIG. 1;

DETAILED DESCRIPTION OF THE INVENTION

The principles of the present invention and their advantages are best understood by referring to the illustrated embodiment depicted in FIGS. 1-7 of the drawings, in which like numbers designate like parts.

Figure 1:
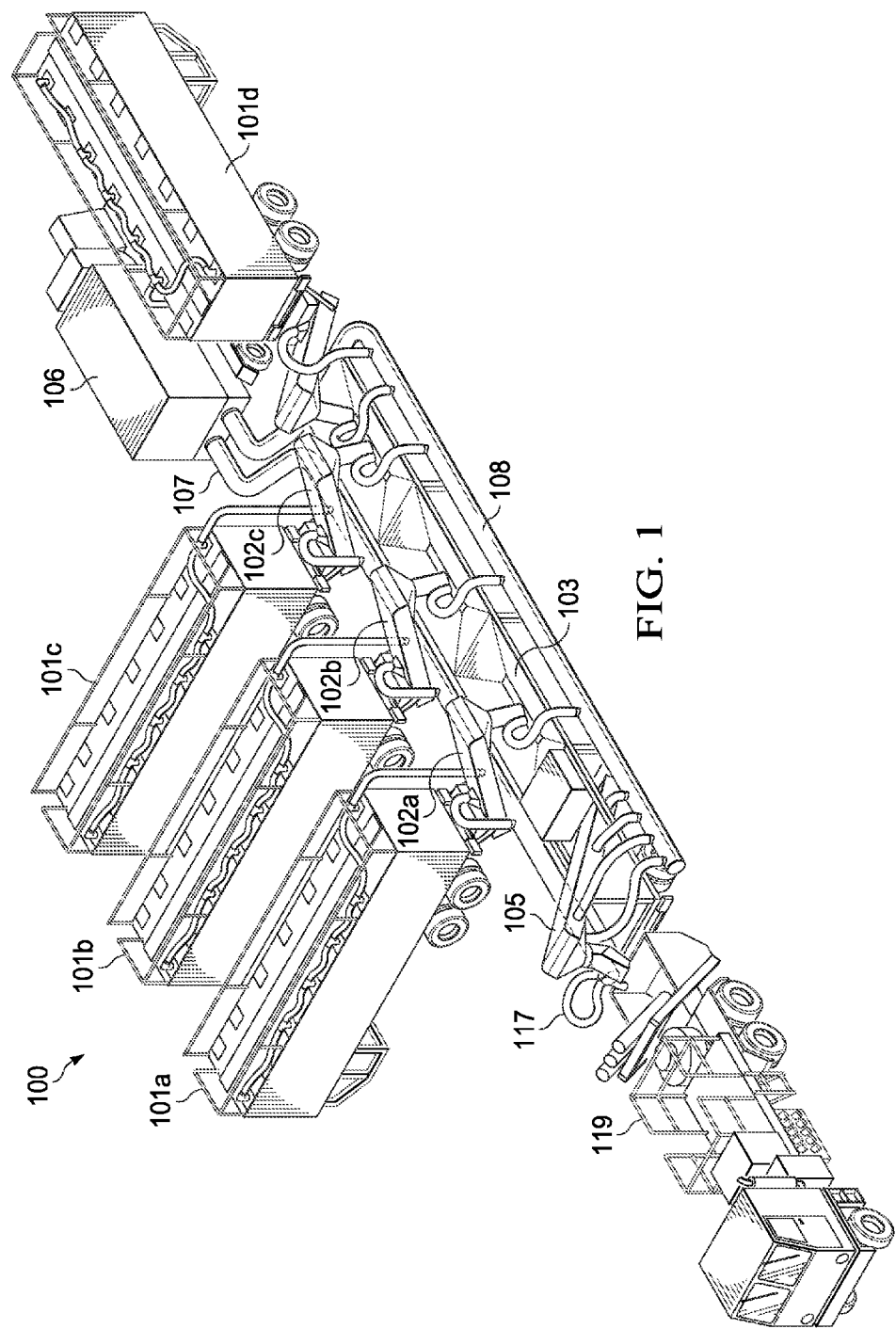
FIG. 1 is a perspective diagram of a representative frac sand transportation and unloading system including a frac sand silica dust control system according to a preferred embodiment of the principles of the present invention.

FIG. 1 is a diagram of an exemplary frac sand transportation, storage, and unloading system 100 including a frac sand silica dust control system according to a preferred embodiment of the principles of the present invention. System 100 is also shown in the plan views of FIGS. 2 and 3, with FIG. 2 emphasizing the air flow paths of the silica dust control system and FIG. 3 generally showing the locations of particular features of the silica dust control system shown in further detail in FIGS. 4-6.

Generally, system 100 is assembled at a hydraulic fracturing worksite and is used to offload frac sand transported to the worksite from a frac sand supplier via trailers and offloaded into a blender. The blender mixes the sand with the water and chemicals to form the fracing fluid. Given the significantly large amounts of frac sand that are typically required during typical hydraulic fracturing operations, a substantial amount of potentially hazardous silica dust is commonly generated during conventional trailer offloading operations. The principles of the present invention advantageously provide for the control of frac sand produced silica dust, which consequently improves personnel safety, helps reduce the need for respirators and other burdensome safety equipment, and allows personnel to work longer and more efficiently at the worksite.

Figure 2:
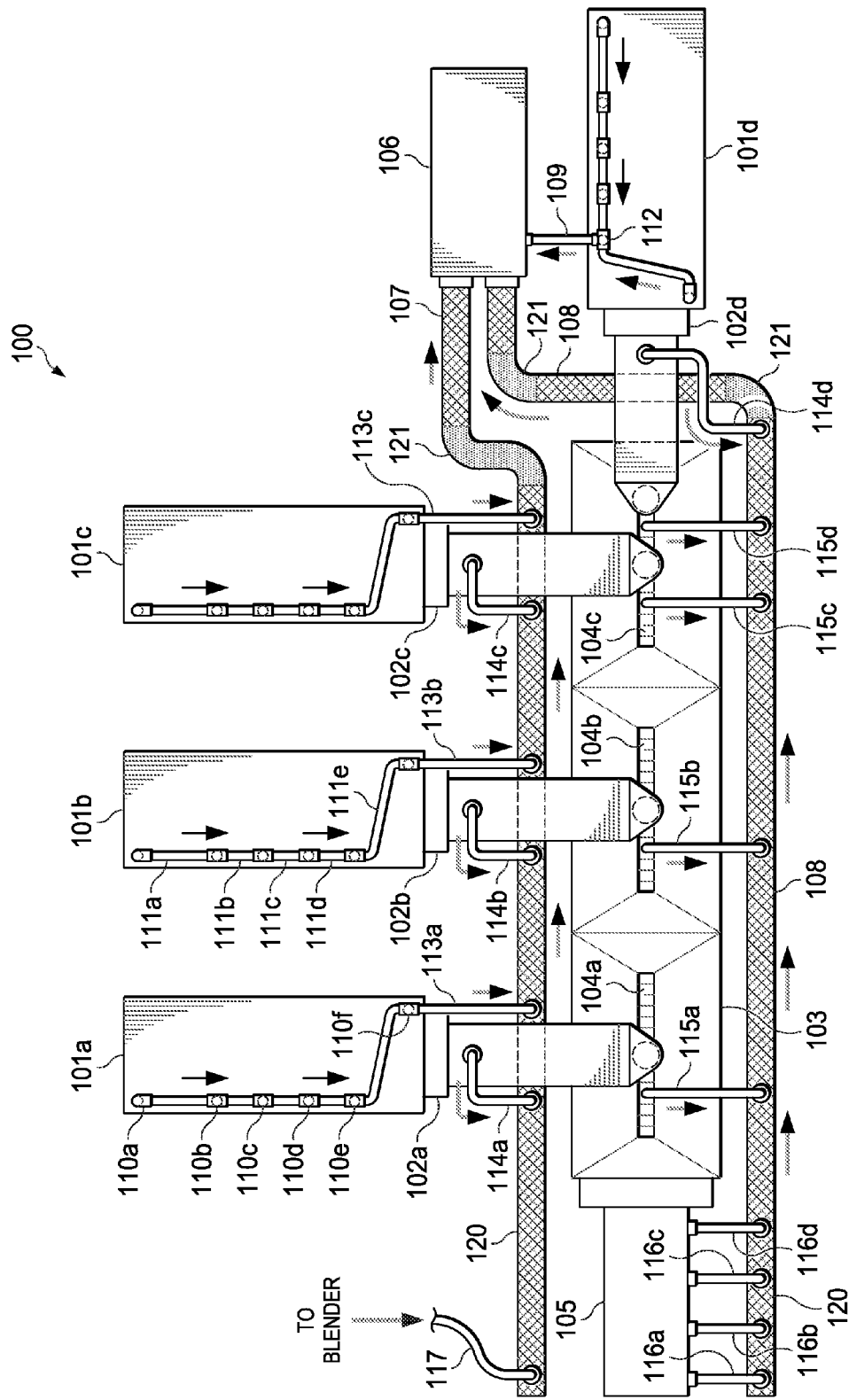
FIG. 2 is a plan view diagram of the frac sand transportation and unloading system of FIG. 1, which emphasizes the airflow paths through the frac sand silica dust control system.
Figure 3:
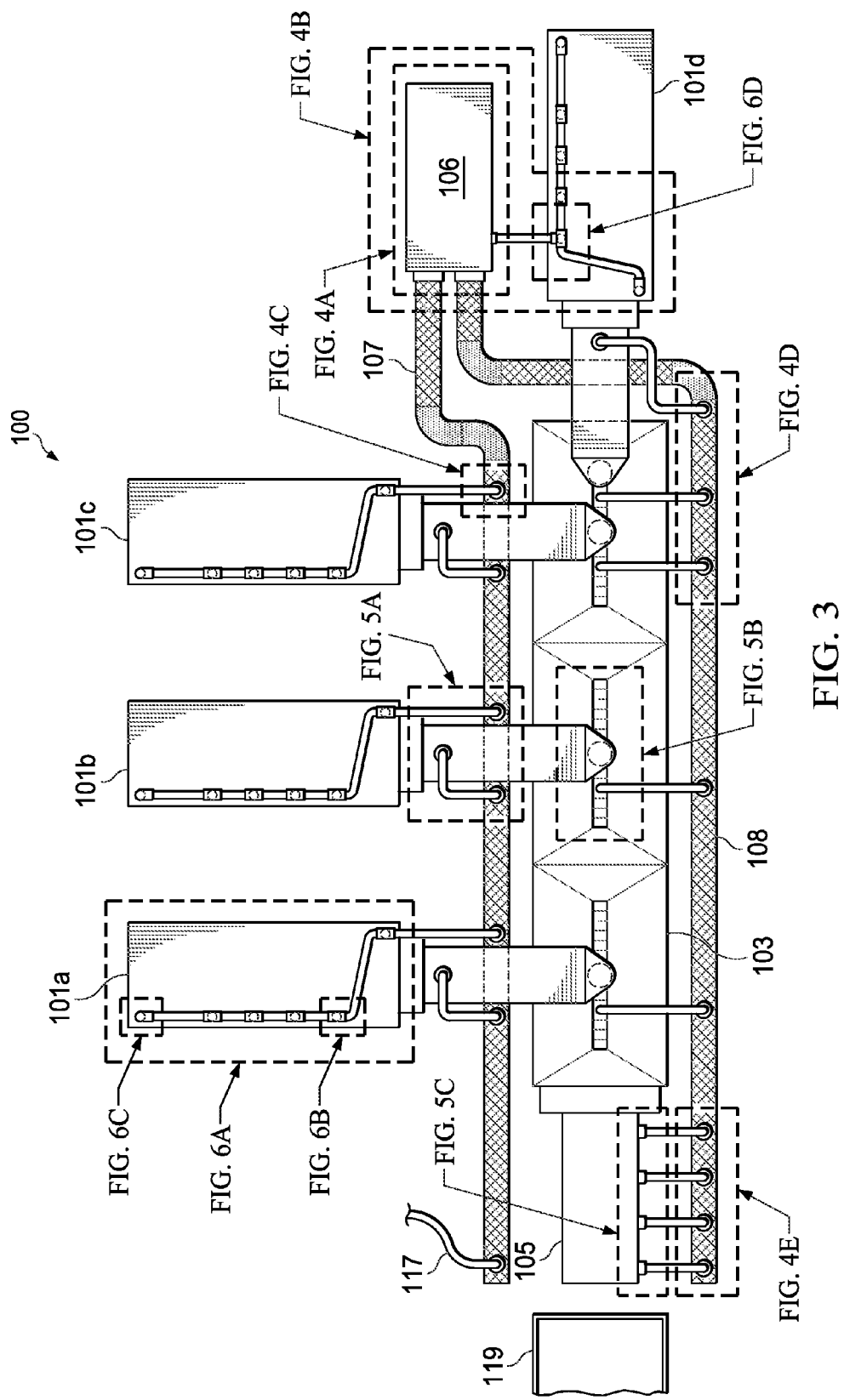
FIG. 3 is a plan view diagram of the frac sand transportation and unloading system of FIG. 1, which generally indicates the locations of particular structures of the frac sand silica dust control subsystem shown in more detail in FIGS. 4-6.

In the illustrated embodiment of system 100 shown in FIGS. 1, 2, and 3, four (4) conventional sand storage trailers 101a-101d are shown at a fracing worksite. While four (4) trailers 101 are shown as an example, the actual number of sand storage trailers 101 utilized in any particular embodiment or configuration of system 100 may vary based on the needs and restrictions at the worksite. The size and configuration of system 100 in any given worksite application will depend on such factors as the amount of sand that must be offloaded, the speed at which sand must be offloaded, and the size and capabilities of the offloading conveyor system. In the illustrated embodiment of system 100, each trailer 101 includes a retractable trailer discharge conveyor (transfer belt) 102a-102d, which receives sand from the compartments of the trailer internal tank via a lateral transfer belt running underneath the trailer tank (not shown). Trailers 101 are, for example, Sand King 3000/4000 frac sand trailers from Convey-All Industries, Inc., although there are a number of other commercially available sand storage trailers known in the art. It should also be recognized that the principles of the present invention are also applicable to embodiments of system 100 in which sand is stored and discharged from other types of fixed and transportable storage systems, such as tanks, silos, compartmented vehicles, and so on.

Each trailer discharge conveyor 102a-102d discharges sand to a conventional transportable conveyor system, for example, Unibelt conveyor system from Convey-All Industries, Inc., which includes a continuous transfer belt running through a lateral conveyor section 103 and a upwardly angled discharge conveyor section 105. During typical offloading operations, one or more randomly selected trailers 101 discharge sand to the lateral conveyor section 103 at a given time.

Sand being discharged by each trailer discharge conveyor 102a-102d falls through slots 104 and onto lateral conveyor section 103. Lateral conveyor section 103 then carries the sand to upwardly angled discharge conveyor section 105, which discharges the sand to a bin of a blender truck 119 (FIGS. 3 and 5C), which mixes the sand with water and chemicals in quantities needed for the formulation of the particular fracing fluid being used.

The amount of sand being transferred at any one time in system 100 can be substantial. For example, a Convey-All Unibelt conveyor can nominally transfer and discharge 22,000 pounds per minute of sand from trailers 101a-101d. The generation of a corresponding substantial amount of fine silica dust is a natural consequence of this transfer and discharge process.

According to the principles of the present invention, silica dust generated during the offloading of trailers 101a-101d is collected by suction at selected points around system 100 most susceptible to the generation and discharge of silica dust. In the preferred embodiment, silica dust is collected: (1) within the compartments of the tanks of trailers 101a-101d; (2) at the base of each trailer discharge conveyor 102a-102d, near the point at which sand is received from the trailer lateral conveyor and the trailer tanks; (3) at the point sand is discharged from trailer discharge conveyors 102a-102d through slots 104 and onto lateral conveyor section 103; (4) at multiple points along upwardly-angled discharge conveyor section 105; and (5) near the point sand is discharged from the spout of discharge conveyor 105 in to the bin of blender 119. It should be noted that in alternate embodiments, silica dust may be collected at additional points, or even fewer points, within system 100, as required.

The silica dust control function of system 100 is driven by a silica dust control unit 106, which draws silica dust-bearing air collected at points across the system though a pair of large manifolds 107 and 108. In the illustrated embodiment of system 100, silica dust control unit 106 also draws silica dust-bearing air directly from trailer 101d through flexible hosing 109, although this is not a strict requirement of the principles of the present invention. Silica dust control unit 106, which may include a baghouse and/or cyclone, separates the silica dust from the air and discharges substantially silica dust-free air into the surrounding environment. One exemplary silica dust control unit, suitable for use as silica dust control unit 106 of system 100, is an ETI Cyclone 20 DC system, available from Entech Industries, which includes multiple twenty-inch (20") inlets and produces a nominal airflow of 20000 cubic feet per minute (cfm).

Silica dust control unit 106 establishes airflow in the direction shown by arrows in FIG. 2. In the preferred embodiment, two intake ports of silica dust control unit 106 are pneumatically connected with manifolds 107 and 108, which run along corresponding sides of lateral conveyor section 103, and one intake port of silica dust control unit 106 is directly pneumatically connected to trailer 101$d$ through flexible hosing 109.

Silica dust generated in each of the compartments of trailers 101$a$-101$d$ is collected through a corresponding set of fittings 110$a$-110$f$ and hoses 111$a$-111$e$. In the illustrated embodiment of system 100, the compartments of trailers 101$a$-101$c$ are pneumatically coupled to manifold 107 through flexible hosing 113$a$-113$c$. For trailer 101$d$, one fitting 110 is replaced with a four-way fitting 112, which directly pneumatically couples the compartments of trailer 101$d$ with silica dust control unit 106.

Flexible hoses 114$a$-114$c$, which tap manifold 107, and the flexible hose 114$d$, which taps manifold 108, collect silica dust at the bases of each trailer discharge conveyor 102$a$-102$d$. Flexible hoses 115$a$-115$d$, which tap manifold 108, collect silica dust at the discharge points of trailer discharge conveyor 102$a$-102$d$ into slots 104$a$-104$c$ of lateral conveyor section 103. Flexible hoses 116$a$-116$d$, which tap manifold 108, collect silica dust moving up upwardly angled discharge conveyor section 105. It should be noted that the pneumatic paths between silica dust collection hoses 113, 114, 115, and 116 and silica dust control unit 106 may vary between embodiments of system 100. In the preferred embodiment of system 100 shown in FIG. 1, the tapping point, as well as the manifold 107 or 108 being tapped, minimizes the lengths of manifolds 107 and 108 and silica dust collection hoses 113, 114, 115, and 116. Generally, so long as sufficient suction is available at a given silica dust collection point, the manifold 107 or 108 tapped, the point on the manifold 107 or 108 tapped the corresponding flexible hose, or both, may be varied.

A flexible hose 117, which taps manifold 107, captures silica dust generated by the discharge of sand from upwardly angled discharge conveyor 105 into the bin of blender 119. (While flexible hose 117 taps manifold 107, in alternate embodiments flexible hose 117 may tap manifold 108).

Manifolds 107 and 108 include a number of straight sections 120 and bent or curved sections 121 and are preferably constructed as tubes or pipes of rigid metal, such as aluminum. Rigid metal embodiments provide durability, particularly when manifolds 107 and 108 sit on or close to the ground and/or are exposed to contact by personnel or to other structures within system 100. However, in alternate embodiments, manifolds 107 and 108 may be constructed, either in whole or in part, from sections of semi-rigid conduit or flexible (corrugated) hose. For example, semi-rigid conduit or flexible hose may be used in sections 121 of manifolds 107 and 108 that must be bent to provide a path around, over, or under, other structures in system 100.

Preferably, manifolds 107 and 108 are each constructed in multiple straight sections 120 and multiple bent or curved sections 121, which are clamped together using conventional clamps. This preferred construction allows manifolds 107 and 108 to be efficiently assembled and disassembled at the worksite, allows the most direct paths to be taken to silica dust control unit 106, and allows the overall system of conduits to be adapted to different configurations of system 100 (e.g., different types and number of trailers 101, different transportable conveyor systems, different surface conditions).

Additionally, the diameters of the various sections of manifolds 107 and 108 may increase or decrease, depending on the airflow provided by the given silica dust control unit 106. The diameters of manifolds 107 and 108 are determined by a number of factors, including the intake diameters of silica dust control unit 106, the airflow produced by silica dust control unit 106, and the amount of suction needed at the silica dust collection points. Similarly, the diameters of silica dust collection hoses 113, 114, 115, and 116 will depend on factors such as the airflow available from silica dust control unit 106, the diameters of manifolds 107 and 108, and the amount of suction required at a given hose inlet. In one typical embodiment of system 100, manifolds 107 and 108 have a nominal diameter of twenty inches (20") and silica dust collection hoses 113, 114, 115, and 116 are nominally within the range of six to sixteen inches (6"-16") in diameter. In other words, the principals of the present invention advantageously allow for variations in the components and configuration of system 100.

It should be recognized that the transportable conveyor system, including lateral conveyor section 103 and discharge conveyor section 105, is not always required. In this case, one or more trailer discharge conveyors 102 discharge sand directly from the corresponding trailers 101 into the bin of blender 119. In embodiments of system 100 that do not utilize the transportable conveyor system, only a corresponding number of flexible hoses 114 and 115 are required for collecting silica dust at the base and outlet of each trailer discharge conveyor 102 discharging to blender 119. (Along with the desired connections for removing dust within the trailers 101 themselves.) Advantageously, only single manifold 107 or 108 may be required in these embodiments.

Figure 4A:
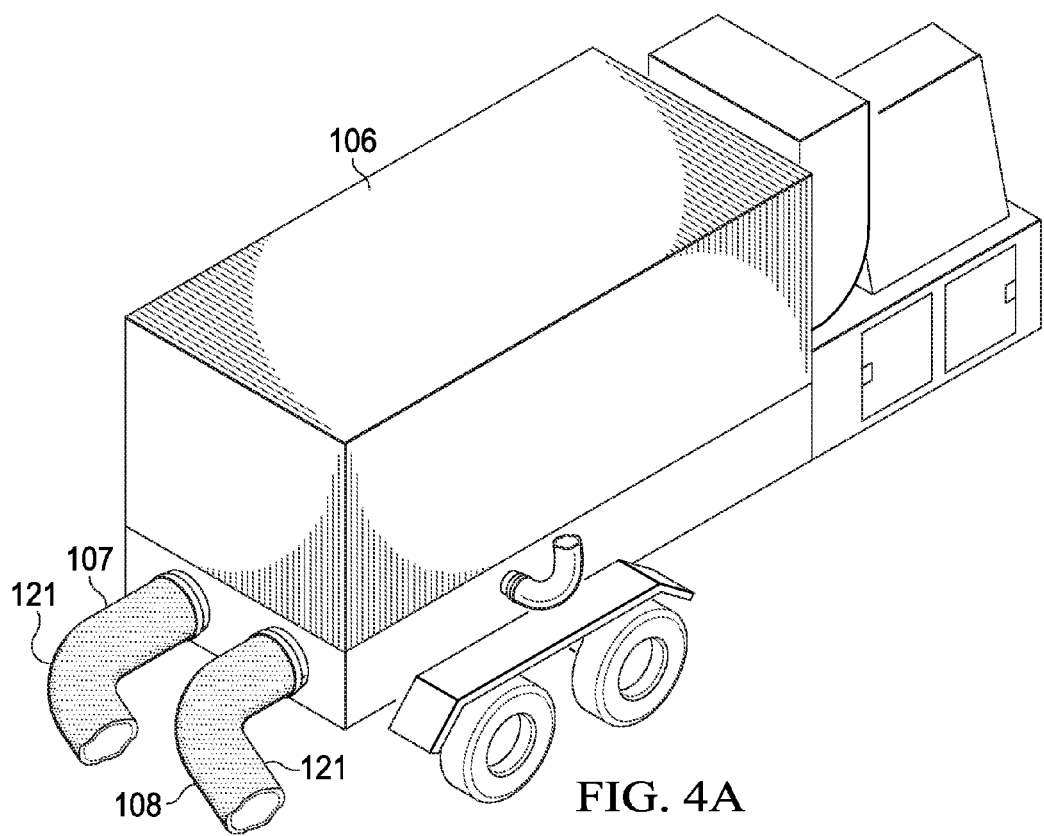
FIG. 4A is a diagram showing in further detail the pneumatic connections between the inlets of the silica dust control unit and the manifolds of FIG. 1.
Figure 4B:
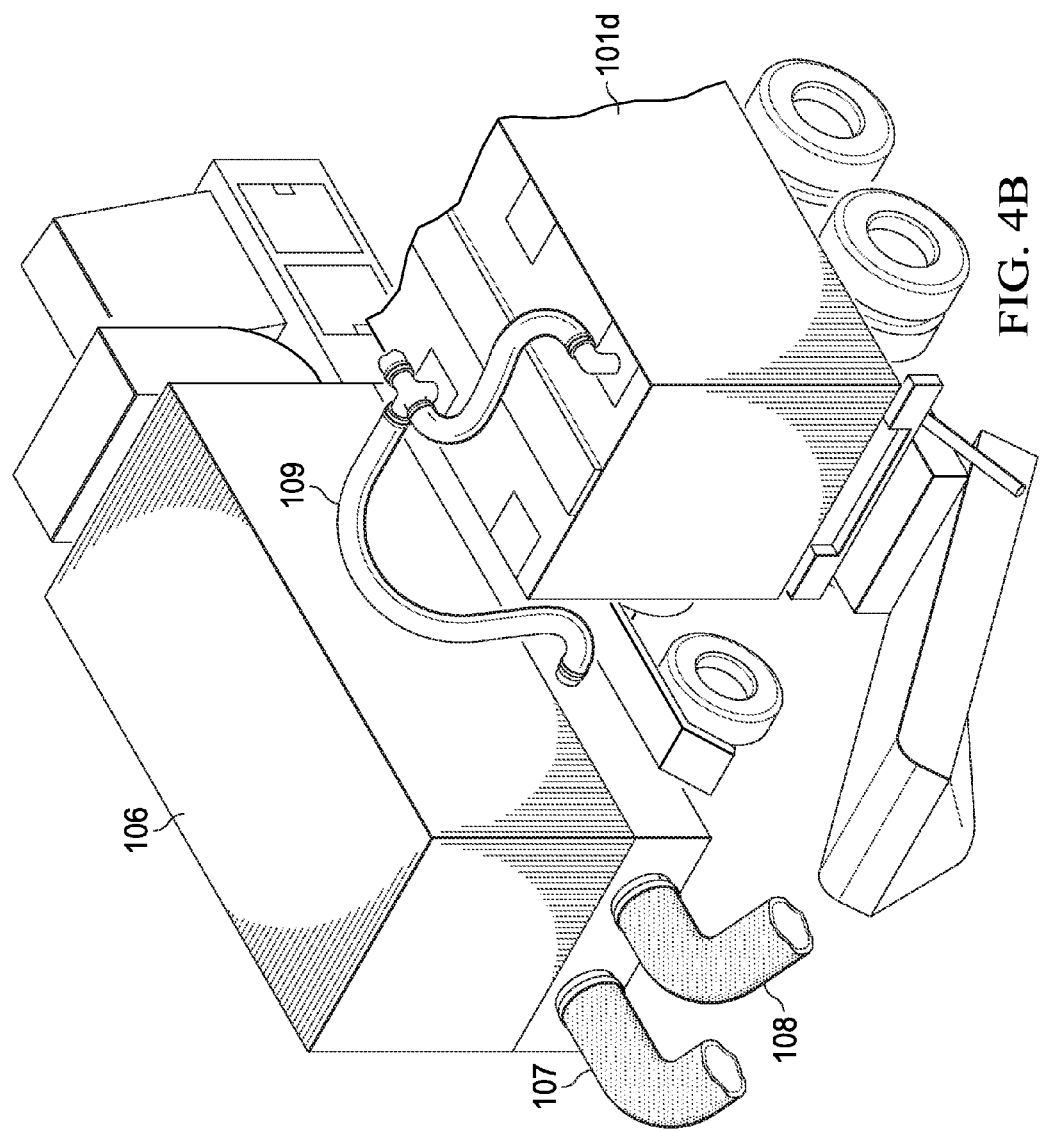
FIG. 4B is a diagram showing in further detail the direct airflow path between the silica dust control unit and the silica dust control conduit subsystem servicing one selected trailer of FIG. 1.

FIG. 4A is a more detailed diagram showing the pneumatic connections between manifolds 107 and 108 and silica dust control unit 106. FIG. 4B shows the direct pneumatic connection between trailer 101$d$ and silica dust control unit 106 through flexible hose 109 in further detail.

FIGS. 4C-4E illustrate representative tapping points between the heavier rigid sections 120 of manifolds 107 and 108 and selected flexible hoses utilized in system 100. In particular, FIG. 4C shows a representative pneumatic connection between manifold 107 and hose 113$c$ collecting silica dust from the tank compartments of trailer 101$c$. FIG. 4D shows representative pneumatic connections between manifold 108 and hose 114$d$, which collects silica dust generated at the base of trailer discharge conveyor 102$d$, and hoses 115$c$ and 115$d$, which collect silica dust generated at corresponding outlets of trailer discharge conveyors 102$c$ and 102$d$. FIG. 4E shows representative pneumatic connections between manifold 108 and hoses 116$a$-116$d$ collecting silica dust generated by discharge conveyor section 105.

As well known in the art, numerous techniques are commonly utilized for connecting flexible hose with a rigid conduit or pipe, many of which are suitable for use in system 100. In the illustrated embodiment shown in FIGS. 4C-4D, an aperture is tapped through the wall of the given manifold 107 or 108 and the lower periphery of a fitting (e.g., aluminum or steel pipe) 401 is attached, for example, by welding or brazing. The lower section of a coupling 402 is attached to the upper periphery of fitting 401, for example by welding or brazing. The tubular upper section 403 of coupling 402 is received with the periphery of the corresponding hose, which is then clamped in place by one or more conventional clamps 404. When necessary, an extension or elbow (not shown) may be provided between upper section 403 of coupling 402 and the corresponding hose. Similarly, a reduction coupling (see FIG. 5A, designator 501) may be provided between upper section 403 and coupling 402, as required to transition to the selected hose diameter.

In the preferred embodiment shown in FIGS. 4C-4E, each coupling 402 includes a slide gate, which provides for air flow control between the given silica dust capture hose 113, 114, 115, and 116 and the corresponding manifold 107 or 108. In addition to allowing control of the amount of suction produced at the capture hose inlet, these slide gates also allow any unused taps to manifolds 107 and 108 to be completely shut off, particularly when a hose is not connected to coupling 402.

Figure 5A:
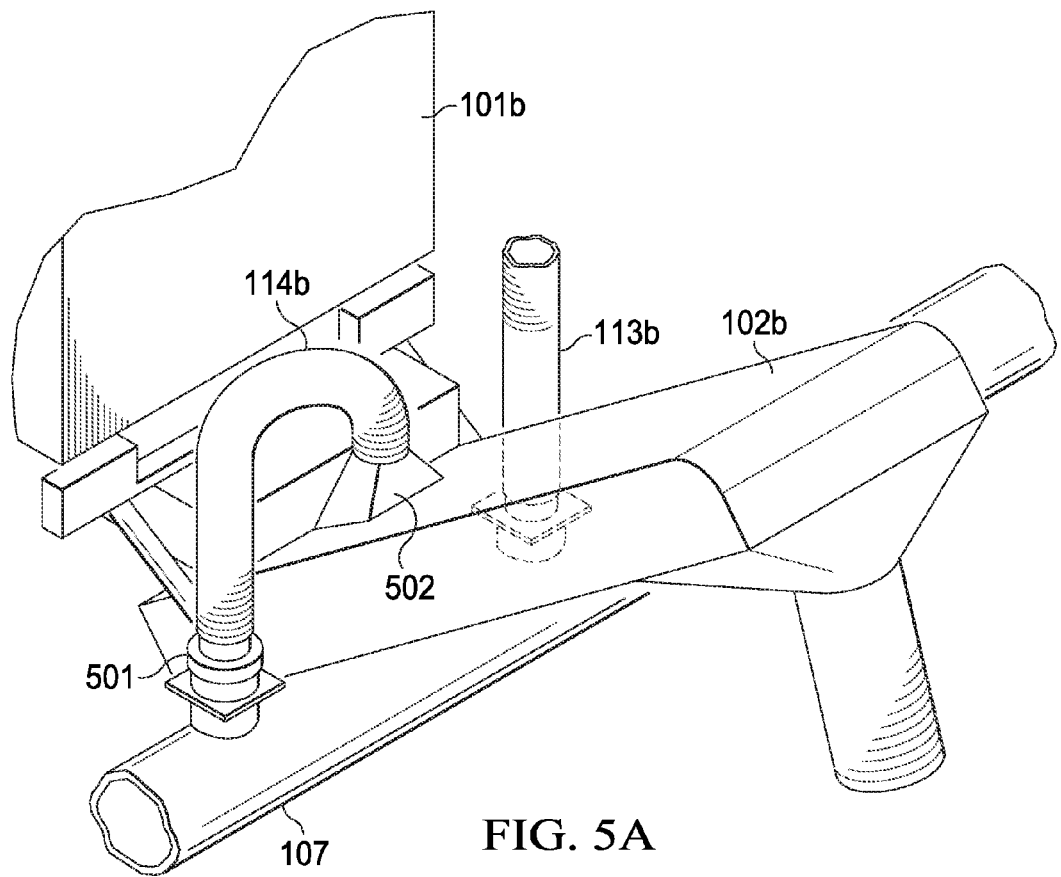
FIG. 5A is a diagram showing in further detail a selected silica dust capture hose controlling silica dust generated by the discharge of frac sand from the tank of representative trailer to the base of the corresponding trailer discharge conveyor shown in FIG. 1.

FIG. 5A depicts in further detail representative silica dust collection hose 114b collecting silica dust generated at the base of trailer discharge conveyor 102b. Hose 114b pneumatically couples with manifold 107 through a reduction coupling 501. The inlet end of hose 114b, which includes an optional nozzle or shroud 502, is disposed proximate the point where the lateral conveyor of trailer 101b discharges sand to the base of trailer discharge conveyor 102b. Silica dust generated during sand transfer is captured by the suction created by silica dust control unit 106 at the discharge end of hose 114b and carried through manifold 107 to silica dust control unit 106 to be filtered from the air. Silica dust collection hoses 114a, 114b, 114c, and 114d, which respectively collect silica dust generated at the bases of trailer discharge conveyors 102a, 102b, 102c and 102d, are similar in configuration and operation.

Figure 5B:
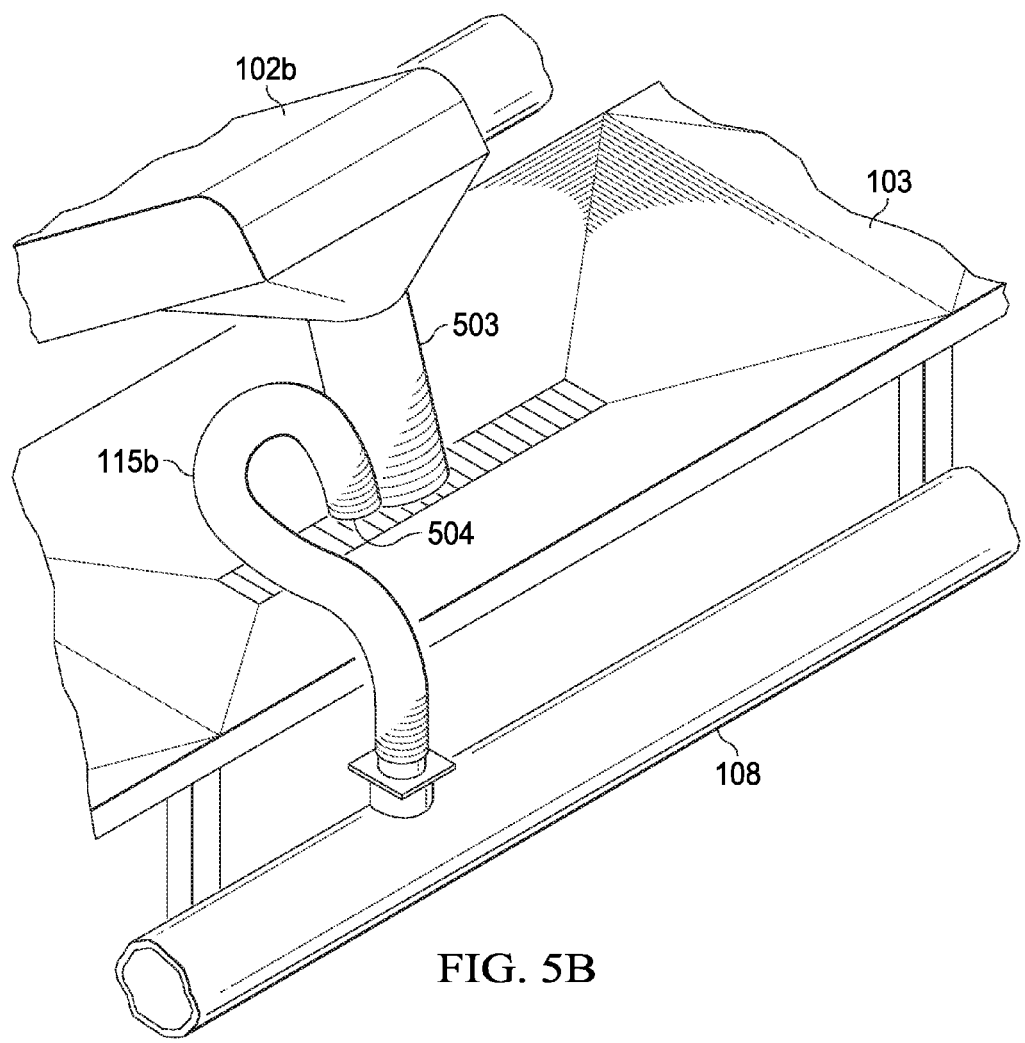
FIG. 5B is a diagram showing in further detail a selected silica dust capture hose controlling silica dust generated by the discharge of frac sand from the outlet of a corresponding representative trailer conveyor to the lateral transfer conveyor section of FIG. 1.

FIG. 5B depicts in further detail representative silica dust collection hose 115b collecting silica dust generated during the discharge of sand from trailer discharge conveyor 102b into lateral conveyor section 103. In the illustrated embodiment, trailer discharge conveyor 102b discharges through a section of flexible hose (conduit) 503 into the corresponding slot 104 of lateral conveyor section 103. The inlet 504 of silica dust collection hose 115b is disposed proximate the outlet of flexible hose 503. The suction produced by silica dust control unit 106 gathers silica dust generated during the transfer of sand, which in turns moves to silica dust control unit 106 for filtering through manifold 108. The configuration and operation of silica dust collection hoses 115a, 115b, 115c, and 115d, which respectively collect silica dust from the discharge points of trailer conveyors 102a, 102b, 102c, and 102d into lateral conveyor section 103 are similar.

Figure 5C:
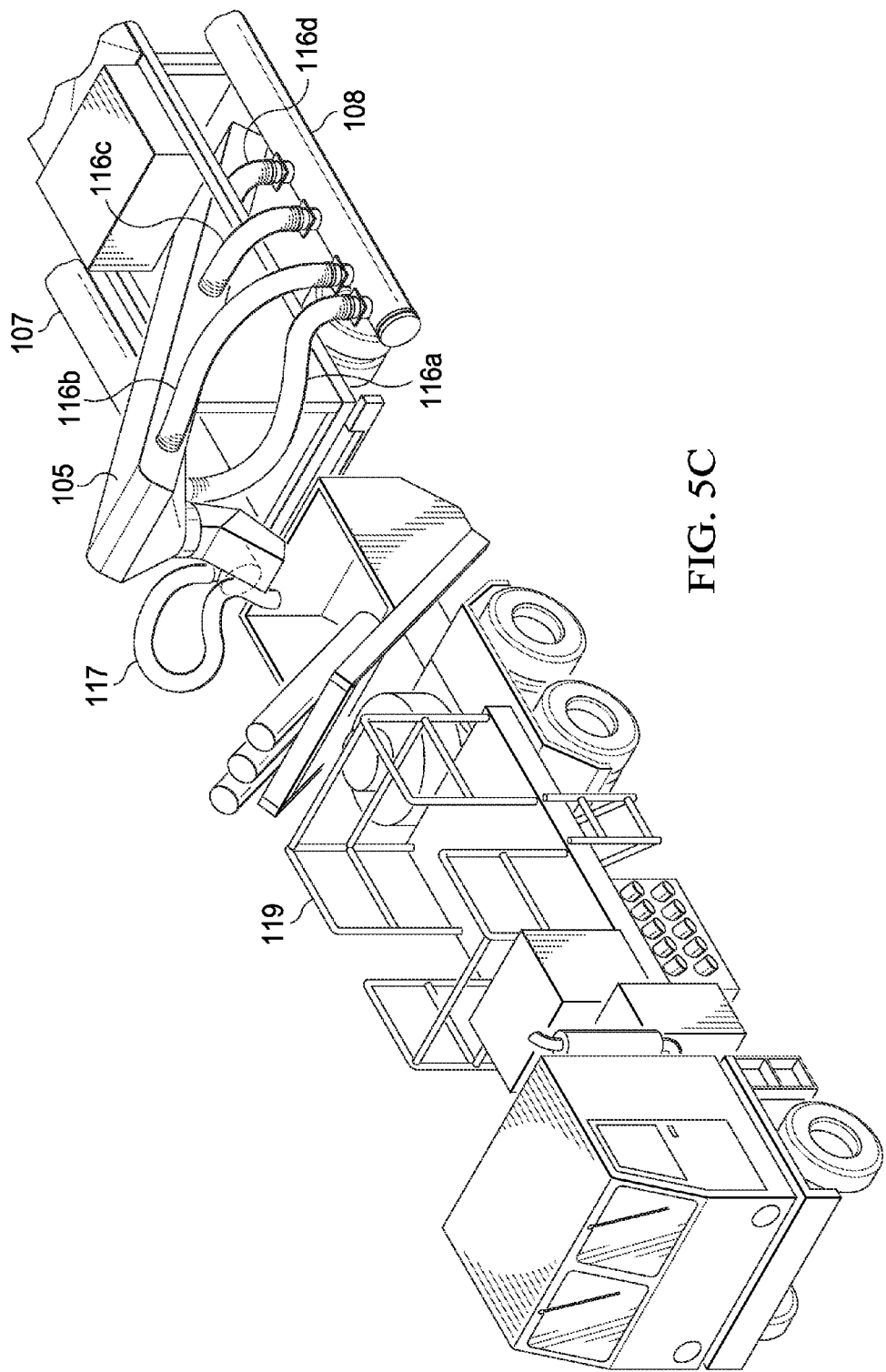
FIG. 5C is a diagram showing the hoses controlling silica dust generated during the movement of sand by the upwardly angled conveyor section of FIG. 1 to a point above the bin of the blender of FIG. 1, along with the silica dust capture hose controlling silica dust generated during the discharge of sand into the blender bin from the conveyor section spout.

Silica dust collection hoses 116a-116d, and the suction generated by silica dust control unit 106, collect silica dust generated by the lifting and discharge of sand by discharge conveyor section 105. As shown in FIG. 5C, silica dust collection hoses 116a-116d extend from apertures through the body of discharge conveyor section 105 at selected spaced-apart points. During operation, silica dust generated as sand moves upwards towards the outlet spout is removed through silica dust collection hoses 116a-116d and manifold 108 for filtering by silica dust control unit 106.

FIG. 5C also one possible configuration for flexible 117 with respect to the spout of upwardly angled conveyor 105. Generally, the intake end of flexible hose 117 is located near the discharge point of the spout of conveyor 105 and creates an updraft, which captures silica dust generated as sand falls into the bin of blender 119. The actual attachment point of flexible hose 117 to the spout of conveyor 105, as well as the proximity of the intake end of hose 117 to the blender bin, may vary in actual practice of system 100.

Figure 6A:
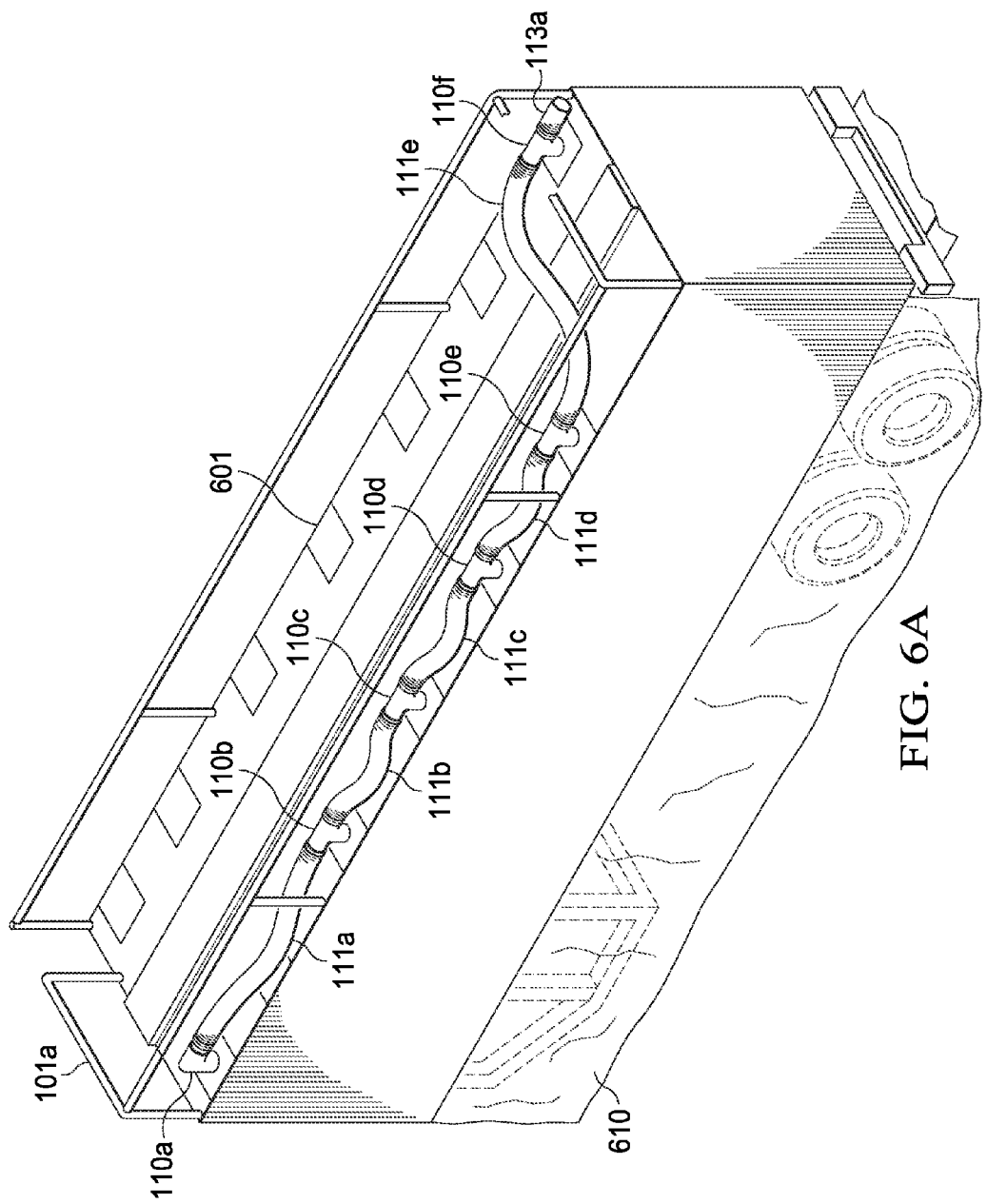
FIG. 6A is a diagram showing in further detail the pneumatic connections of the silica dust control conduit subsystem of a representative one of the trailers of FIG. 1.
Figure 6B:
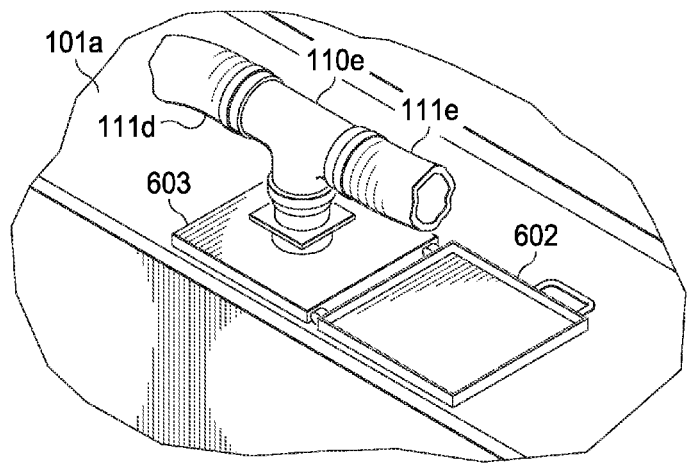
FIG. 6B is a diagram showing in further detail one of the T-fittings interconnecting the air conduits of the silica dust control conduit subsystem shown in FIG. 6A.
Figure 6C:
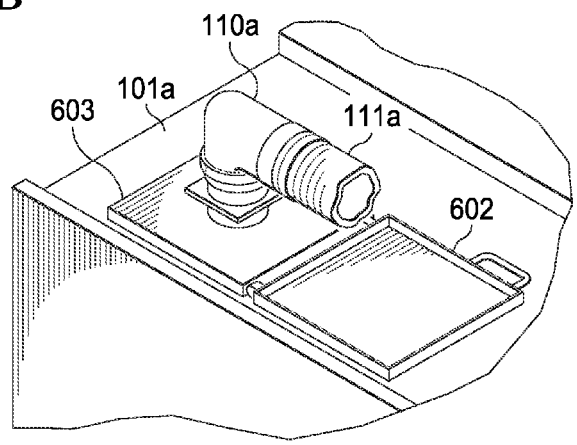
FIG. 6C is a diagram showing a one of the end fittings terminating the air conduits of the silica dust control conduit subsystem shown in FIG. 6A.

As discussed above, silica dust generated in the compartments of the tanks of trailers 101a-101d is collected by a set of fittings 110 and hoses 111. FIGS. 6A-6C depict this subsystem in further detail, using trailer 101a as an example.

Each trailer 101 includes a set of inspection hatches 601 through the trailer roof. In the illustrated embodiment, trailers 101 include two rows of hatches 601 that run along opposing sides of the trailer roof. (In other embodiments of trailers 101, the number and location of inspection hatches 601 may differ. For example, some commercially available sand storage trailers utilize a single row of inspection hatches that run along the centerline of the trailer roof.)

In addition, FIG. 6A shows optional skirts 610, which run along each side of the depicted trailer 101. Skirts 610, which are preferably constructed from a durable flexible material, such as heavy plastic or canvas, contain silica dust generated by the movement of sand through the lateral conveyor that runs underneath the trailer tank.

Figure 6D:
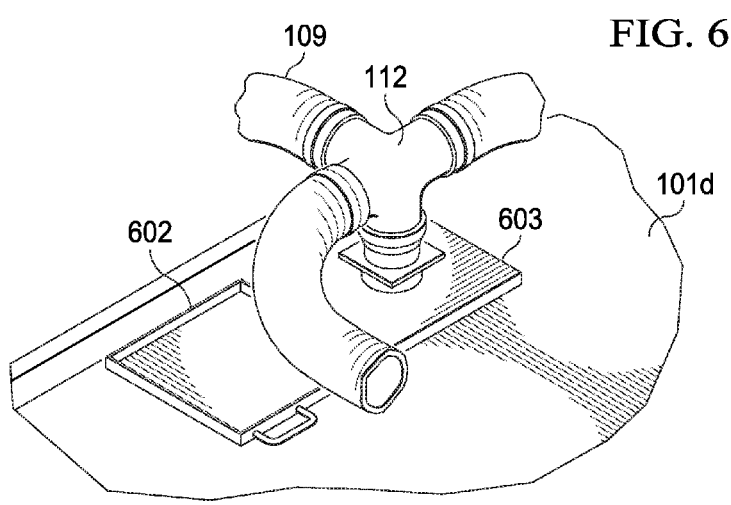
FIG. 6D is a diagram showing the four-way fitting interconnecting the air conduits of the silica dust control subsystem of one particular trailer with the silica dust control unit, as shown in FIG. 4B.

In the preferred embodiment of system 100, silica dust collection is performed using the hatches 601 running along one side of the trailer tank, although in alternate embodiments silica dust collection could be performed using the hatches running down both sides of the trailer tank. For a given compartment, the regular hatch 602 is pulled back and replaced with corresponding cover 603 attached an associated fitting 110 (FIGS. 6B-6D).

FIG. 6B shows in further detail an example of a T-shaped (three-way) fitting 110e interfacing with corresponding hoses 111d and 111e. FIG. 6C shows an example of a elbow (two-way) fitting 110a and the final section of hose 111a in the trailer silica dust subsystem. The remaining connections between the given trailer 101 and fittings 110 and 111 are similar. The four-way fitting 112 used to connect trailer 101d and silica dust control unit 106 through hose 109 is shown in detail in FIG. 6D. In each case, fittings 110 include well-known transitions and clamps to connect to hoses 111. Similar to the taps shown in FIGS. 4C-4E, each fitting, such as T-shaped (three-way) fitting 110e, elbow fitting 110a, and four-way fitting 112, includes a slide gate for controlling airflow between the space within the given trailer 101 and manifold 107.

Figure 7A:
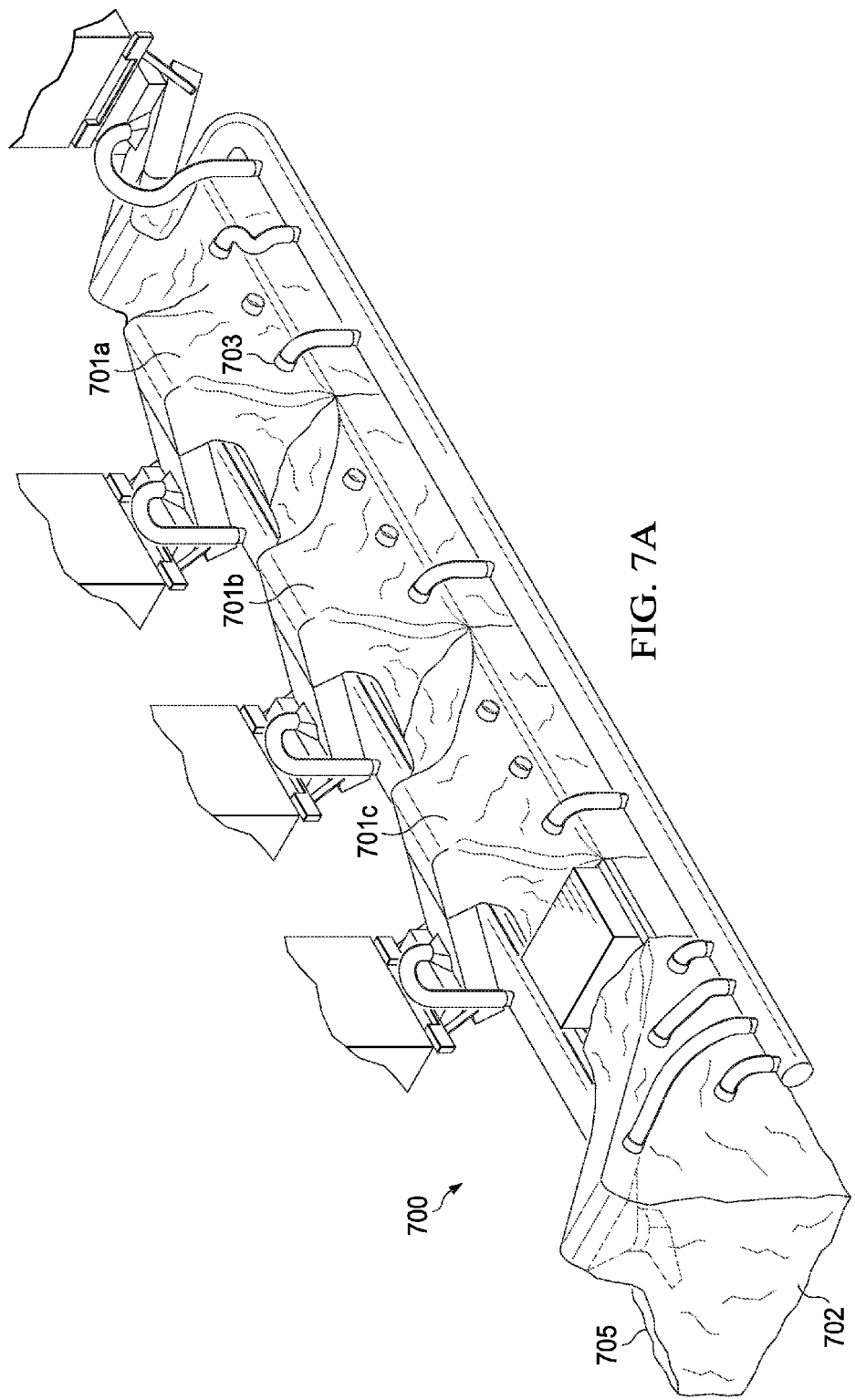
FIG. 7A is a diagram showing an alternate embodiment of the principles of the present invention in which a cover is provided over portions of the representative frac sand transportation and unloading system of FIG. 1 for containing silica dust generated during movement of sand through the system.
Figure 7B:
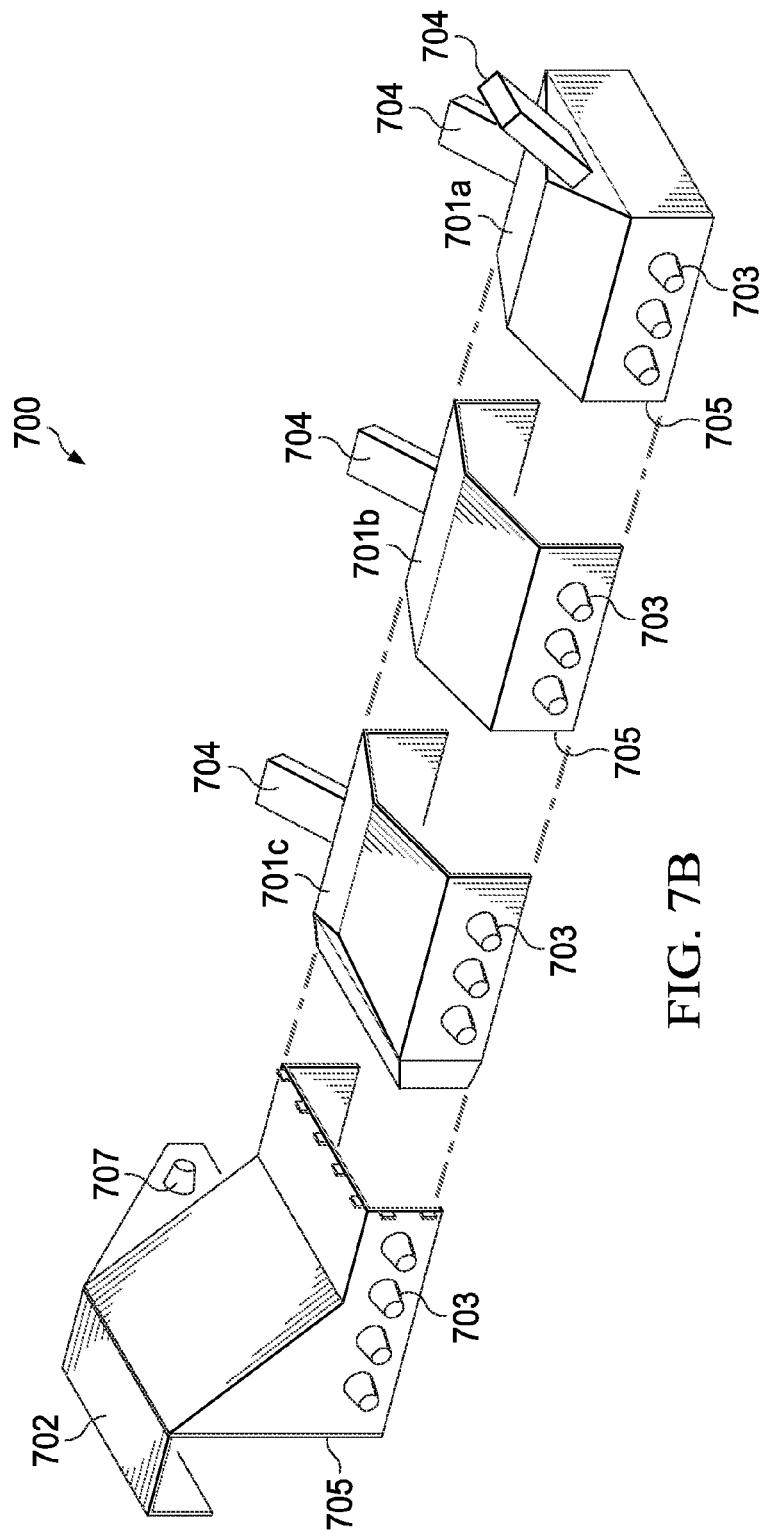
FIG. 7B is a conceptual diagram providing a first detailed view of a representative embodiment of the cover shown in FIG. 7A.
Figure 7C:
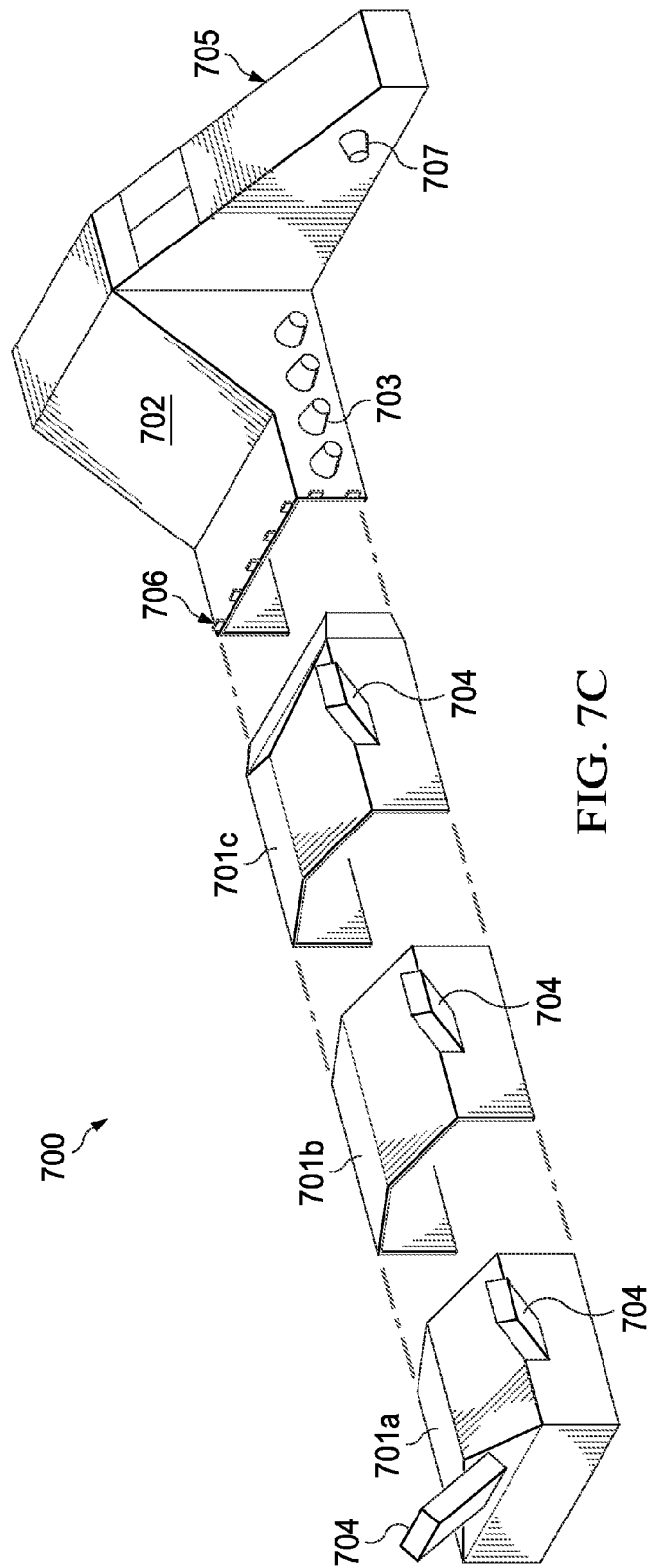
FIG. 7C is a conceptual diagram providing a second detailed view of the representative embodiment of the cover shown in FIG. 7A.

FIGS. 7A-7C illustrate an enhancement to system 100, which includes a flexible cover system 700 for containing the silica dust generated during the movement of sand through the system. Preferably, flexible cover system 700 extends over the discharge ends of trailer discharge conveyors 102a-102d, the length of lateral conveyor section 103, and the length of upwardly angled discharge conveyor section 105. (In alternate embodiments, flexible cover system 700 may only cover portions of system 100, as necessary to effectively control silica dust.)

In the preferred embodiment, flexible cover system 700 is constructed as separate sections 701a-701c and 702, as shown in FIGS. 7B and 7C. Sections 701a-701c cover corresponding portions of lateral conveyor section 103 and section 702 covers upwardly angled discharge conveyor section 105. Boots 703 are provided to allow insertion of corresponding flexible capture hoses 115 and 116 into the underlying silica dust containment spaces when cover system 700 is deployed. Boots 704 extend over the ends of trailer discharge conveyors 102a-102d.

Section 702 also includes a lateral extension 705 for covering the spout of upwardly angled discharge conveyor section 105. A boot 707 provides for the insertion of flexible hose 117 into extension 702 for fastening on or near the outlet of the discharge spout of conveyor 105.

Flexible cover system 700 is preferably constructed of canvas, heavy plastic, or other flexible material that is durable, relatively easy to deploy and remove, and transportable. Preferably, the surfaces of the selected material are impervious to frac sand, as well as able to withstand the normal wear and tear expected at a fracing worksite. When deployed, sections 701 and 702 are attached to each other with areas of Velcro 706 or similar attachment system, which minimizes the escape of silica dust at the seams between the sections.

In sum, the principles of the present invention provide for the efficient capture and removal of silica dust generated during the offloading of frac sand at a worksite. Silica dust removal is performed near, but not limited to, substantial sources of hazardous silica dust, including at trailer to trailer conveyor sand transfer point, each point of transfer from the trailer discharge conveyors and the lateral site conveyor, and points along the lifting/discharge conveyor. The embodiments of the inventive principles are scalable, and can be applied to any discharging system serving single or multiple frac sand storage trailers and can be implemented with various commercially available cyclone/baghouse silica dust removal systems. Moreover, the configuration and construction of these embodiments are also variable, allowing silica dust control to be effectively implemented under widely varying worksite conditions.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A system for controlling silica dust generated during the transfer of frac sand from a storage container through a conveyor system including a container conveyor for offloading sand from the container and a lateral conveyor for laterally transporting sand received from the container conveyor, comprising:
   an air system for generating a negative pressure;
   a system of conduits having inlets for collecting silica dust generated at selected points along the conveyor system during the transfer of sand from the container, the system of conduits comprising:
      at least one manifold extending along at least a portion of a lateral side of the lateral conveyor; and
      a plurality of flexible conduits pneumatically coupled to the air system through the at least one manifold and providing the inlets; and
   a flexible cover system enclosing a space extending substantially an entire length of the lateral conveyor, a discharge end of the container conveyor extending through an aperture in a selected wall of the flexible cover system to a discharge point within the enclosed space, wherein the at least one manifold is disposed below the discharge point within the enclosed space and at least one of the plurality of flexible conduits extends upward from the at least one manifold to provide at least one inlet disposed within the enclosed space to collect dust generated by the discharge of sand from the container conveyor,
   wherein the air system is pneumatically coupled to the system of conduits and generates a negative pressure at each of the inlets to induce the collection of silica dust at the selected points along the conveyor system.

2. The system of claim 1, wherein:
   the container comprises a trailer;
   the container conveyor comprises a trailer conveyor for offloading sand from the trailer; and
   the system of conduits includes a conduit having an inlet for collecting silica dust generated by the discharge of sand from the trailer to a base of the trailer conveyor.

3. The system of claim 1, wherein:
   the conveyor system includes a lifting conveyor for lifting and discharging sand received from the lateral conveyor; and
   the system of conduits includes at least one conduit having an inlet for collecting silica dust generated during the transfer of sand through the lifting conveyor.

4. The system of claim 3, wherein the system of conduits further includes at least one conduit having an inlet for collecting silica dust generated during the discharge of sand from a spout of the lifting conveyor.

5. The system of claim 1, wherein the system includes at least one conduit for collecting silica dust generated in a sand holding space within the container.

6. The system of claim 1, wherein the air system comprises a silica dust control unit including a baghouse for removing silica dust from air received from the system of conduits.

7. The system of claim 1, wherein the flexible cover system further comprises a flexible cover covering a periphery of a length of the container conveyor proximate the discharge end.

8. The system of claim 3, wherein the flexible cover system further provides a second enclosed space enclosing substantially an entire length of the lifting conveyor and further includes a boot extending outward from a selected cover system sidewall for receiving an inlet end of a conduit of the system of conduits for capturing dust within the second enclosed space.

9. The system of claim 1, wherein the cover system comprises a plurality of cover sections fastened together by a set of fasteners.

10. A system for controlling silica dust in a frac sand transport system including a transportable conveyor system and a set of at least one trailer having a tank and a trailer discharge conveyor, comprising:
   an airflow system comprising:
      a manifold;
      for each trailer in the set, a corresponding first conduit coupled to the manifold of the airflow system for capturing silica dust generated during the transfer of sand from the trailer discharge conveyor to a lateral conveyor section of the transportable conveyor system; and
      for each trailer in the set, a corresponding second conduit coupled to the airflow system for capturing silica dust generated in a sand holding space within the tank of the trailer;
   a flexible cover defining an enclosed space extending substantially an entire length of the lateral conveyor section, wherein for each trailer in the set, a discharge end of the trailer conveyor extends through an aperture in a selected wall of the flexible cover to a discharge point within the enclosed space, wherein the manifold extends along at least a portion of a lateral side of the lateral conveyor and is disposed below the discharge point within the enclosed space and the first conduit extends upward from the manifold such that an inlet of the first conduit is disposed within the enclosed space adjacent to the discharge point; and an air unit coupled to the airflow system for creating airflow through the airflow system to induce capture of silica dust through the conduits and for separating the silica dust from the airflow.

11. The system of claim 10, further comprising at least one third conduit capturing silica dust generated at a point along the conveyor system during the transport of frac sand by the conveyor system.

12. The system of claim 11, wherein the conveyor system further includes a lifting conveyor section and the at least one third conduit is for capturing silica dust generated at a point along the lifting conveyor section of the conveyor system.

13. The system of claim 12, wherein the at least one third conduit is for capturing silica dust generated at a point adjacent to an outlet of a spout of the lifting conveyor section of the conveyor system.

14. The system of claim 12, further comprising another cover enclosing the lifting conveyor section of the conveyor system, wherein an inlet of the at least one third conduit captures silica dust contained within the cover.

15. The system of claim 10, wherein a tank of the at least one trailer includes a plurality of compartments and the corresponding second conduit taps a corresponding one of the plurality of compartments.

16. The system of claim 10, further comprising another flexible cover covering a periphery of the length of the trailer discharge conveyor proximate the discharge end.

17. The system of claim 10, wherein the manifold of the airflow system couples the conduit system to the air unit.

18. The system of claim 12, further comprising another flexible cover enclosing substantially an entire length of the lifting conveyor section and including a boot extending outward from the another flexible cover for receiving an inlet end of the third conduit for capturing dust enclosed by the another flexible cover.

19. The system of claim 10, wherein the cover comprises a plurality of sections fastened together by a set of fasteners.

* * * * *